United States Patent
Cuffaro

(10) Patent No.: US 7,043,274 B2
(45) Date of Patent: May 9, 2006

(54) SYSTEM FOR EFFICIENTLY PROVIDING COVERAGE OF A SECTORIZED CELL FOR COMMON AND DEDICATED CHANNELS UTILIZING BEAM FORMING AND SWEEPING

(75) Inventor: Angelo Cuffaro, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 331 days.

(21) Appl. No.: 10/329,886

(22) Filed: Dec. 26, 2002

(65) Prior Publication Data

US 2004/0002363 A1 Jan. 1, 2004

Related U.S. Application Data

(60) Provisional application No. 60/392,597, filed on Jun. 28, 2002, provisional application No. 60/420,355, filed on Oct. 21, 2002.

(51) Int. Cl.
*H04M 1/00* (2006.01)

(52) U.S. Cl. ............... 455/562.1; 455/575.1; 455/561; 455/456.1; 455/101

(58) Field of Classification Search ............. 455/562.1, 455/575.1, 560, 561, 575.7, 404.2, 414.2, 455/456.1, 521
See application file for complete search history.

(56) References Cited

U.S. PATENT DOCUMENTS

| | | | |
|---|---|---|---|
| 5,596,329 A | 1/1997 | Searle et al. | |
| 5,596,333 A | 1/1997 | Bruckert | |
| 5,621,752 A | 4/1997 | Antonio et al. | |
| 5,907,816 A | 5/1999 | Newman et al. | |
| 6,081,233 A | 6/2000 | Johannisson | |
| 6,118,767 A * | 9/2000 | Shen et al. | 370/252 |
| 6,167,286 A | 12/2000 | Ward et al. | |
| 6,178,333 B1 | 1/2001 | Feuerstein et al. | |
| 6,205,337 B1 | 3/2001 | Boch | |
| 6,233,466 B1 * | 5/2001 | Wong et al. | 455/562.1 |
| 6,289,005 B1 * | 9/2001 | Katz | 370/328 |
| 6,330,460 B1 | 12/2001 | Wong et al. | |
| 6,347,220 B1 | 2/2002 | Tanaka et al. | |
| 6,498,939 B1 * | 12/2002 | Thomas | 455/562.1 |
| 6,553,012 B1 | 4/2003 | Katz | |
| 6,577,879 B1 | 6/2003 | Hagerman et al. | |
| 2002/0039912 A1 * | 4/2002 | Yamaguchi et al. | 455/561 |
| 2002/0094843 A1 * | 7/2002 | Hunzinger | 455/562 |
| 2003/0017853 A1 * | 1/2003 | Kanamaluru et al. | 455/562 |
| 2003/0040337 A1 * | 2/2003 | Ylitalo | 455/562 |
| 2004/0203929 A1 * | 10/2004 | Akhteruzzman | 455/457 |
| 2004/0259564 A1 * | 12/2004 | Farley et al. | 455/453 |

FOREIGN PATENT DOCUMENTS

| | | |
|---|---|---|
| CN | 1298610 | 6/2001 |
| CN | 1346221 | 4/2002 |
| EP | 0932218 | 7/1999 |

* cited by examiner

*Primary Examiner*—George Eng
*Assistant Examiner*—Dai Phuong
(74) *Attorney, Agent, or Firm*—Volpe and Koenig, P.C.

(57) ABSTRACT

A communication system transmits and receives communications within a sectorized cell between at least one primary station and at least one secondary station. The communication system includes a unit for generating and shaping a beam; an antenna for transmitting and receiving signals within said beam; and a unit for directing the beam. The shaped beam is directed at a plurality of predetermined directions; either continuously or discretely.

4 Claims, 4 Drawing Sheets

SYSTEM FOR EFFICIENTLY PROVIDING COVERAGE OF A SECTORIZED CELL FOR COMMON AND DEDICATED CHANNELS UTILIZING BEAM FORMING AND SWEEPING

CROSS REFERENCE TO RELATED APPLICATION

This application claims priority from U.S. provisional applications serial Nos. 60/392,597, filed Jun. 28, 2002 and No. 60/420,355, filled Oct. 21, 2002, which are incorporated by reference as if fully set forth.

BACKGROUND

Sectoring is a well known technique for providing distinct coverage areas within individual cell sites and can be achieved with "smart antenna" technology. Smart antenna methods dynamically change the radiation pattern of an antenna to form a "beam," which specifically focuses the antenna's transmitted and received energy and provides a desired topographical coverage. Beam forming is an enhancement on sectoring in that the sectors can be adjusted in direction and width. Both techniques are employed to: 1) reduce interference between cells and the wireless transmit/receive units (WTRUs) deployed within the cells; 2) increase the permissible range between a receiver and a transmitter; and 3) locate the geographic position of a WTRU. These techniques are usually applied to the dedicated channels of the WTRUs once their general location is known.

Prior to knowing the location of a WTRU, the common channels broadcast information that all WTRUs may receive. While this information may be sent in static sectors, it is not sent in variable beams. There are inherent inefficiencies in this approach in that extra steps are required to determine the appropriate beam to use for the dedicated data exchanges. Additionally, the beams must be generally large enough to provide a broad coverage area, which in turn means their power decreases with distance from the transmitter.

The common channel coverage found in the prior art shown in FIG. 1 has four overlapping wide beams. This provides omni-directional coverage, while giving a degree of reuse to the cell site. It also provides a coarse degree of directivity to the WTRUs (WTRU1, WTRU2) detecting one of the transmissions, by having each sector transmit a unique identifier.

Referring to FIG. 2, downlink dedicated beams between a primary station (P) and several WTRUs (WTRU3, WTRU4) are shown. Assuming the same power from the primary station P for FIGS. 1 and 2 and all other attributes being equal, the WTRUs (WTRU3 and WTRU4) shown in FIG. 2 can be further away from the primary station P than the WTRUs (WTRU1, WTRU2) shown in FIG. 1. Alternatively, the coverage areas can be made approximately the same by decreasing the symbol rate or increasing the error correction coding. Either of these approaches decreases the data delivery rate. This also applies to the receiver uplink beam patterns of the primary station P; and the same comments about coverage and options apply for data from the WTRUs to the primary station P.

In the prior art, the range of a primary station P or a WTRU is generally increased by combinations of higher power, lower symbol rates, error correction coding and diversity in time, frequency or space. However, these methods yield results that fall short of optimized operation. Additionally, there is a mismatch between the common and dedicated communications channels in the ways that coverage is aligned.

The downlink dedicated channels may be transmitted in a beam having a narrower width by a smart antenna. The narrower beam serves a narrower area. The benefit in narrowing the beam is the reduced interference to WTRUs in other areas of the cell, which has a positive impact on the system efficiency. However, dedicated channels are still susceptible to interference generated by the common channels. The common channels have to be available to all mobiles in the entire coverage area. FIG. 3 shows the radiation pattern for the current deployment of a cellular system using a smart antenna system emitting a beam with a narrow width over a small coverage area 10 for the dedicated channel coverage and an omni-directional antenna emitting an omni-directional pattern over a wide coverage area 12 for the common channel coverage. Since the common channel is transmitted at a high output power to ensure complete cell coverage, a WTRU's reception of the dedicated channel may be interfered with as the WTRU's location becomes closer to the high powered common channel transmitter.

It is therefore desirable to provide a method of providing equitable coverage for both common and dedicated channels in wireless communication systems without the disadvantages of prior art.

SUMMARY

A communication system for transmitting and receiving common channel and dedicated channel communications between at least one primary station and at least one secondary station in a sectorized cell uses at least one beam comprising an antenna. The system includes a device for generating and shaping the beam; and a device for sweeping the shaped beam. The sweeping device selectively directs the shaped beam at a plurality of directions.

BRIEF DESCRIPTION OF THE DRAWING(S)

DETAILED DESCRIPTION OF THE PREFERRED EMBODIMENTS

Figure 1:
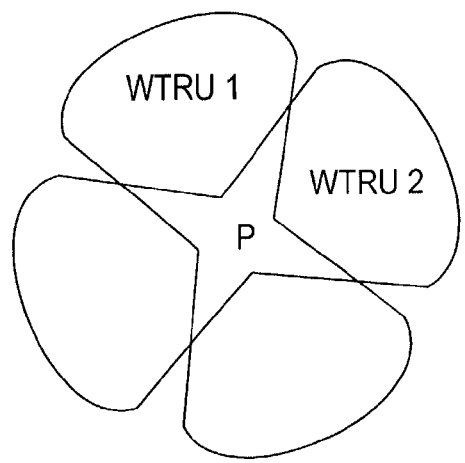
FIG. 1 is a prior art common channel coverage scheme between a primary station and several WTRUs with four overlapping wide beams.
Figure 2:
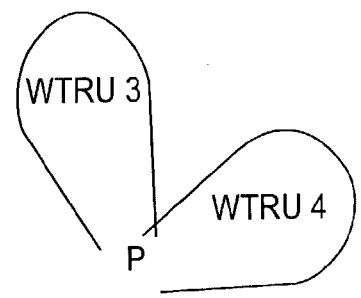
FIG. 2 is a prior art scheme of downlink dedicated beams between a primary station and several WTRUs using dedicated beams.
Figure 3:
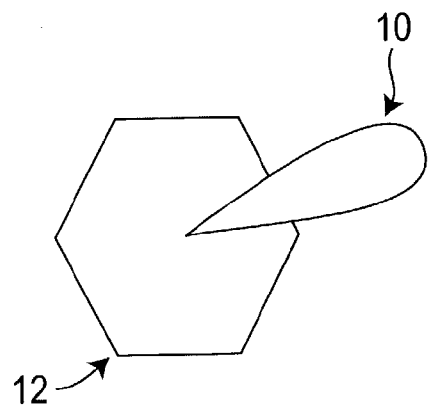
FIG. 3 is a prior art of the radiation pattern for a cellular system using a narrow-width beam over a small coverage area for dedicated channel coverage and an omni-directional pattern over a wide coverage area for common channel coverage.

The present invention will be described with reference to the drawing figures where like numerals represent like elements throughout. The foregoing statements about beam forming are applicable to both transmission of the signal and its reception. For example, narrower transmission beams cause less interference to those devices outside the beam. Conversely, a narrower reception beam decreases interference from signals outside the beam. The foregoing description of the invention is applicable to both the reception and transmission of signals. The context of a particular part of the description will sometimes explicitly refer to reception or transmission when this is not case.

This invention generally relates to considerations of coverage in a wireless communication system utilizing smart antennas to emit both common and dedicated channels, and to providing similar coverage for common and dedicated channels. The common channels are utilized, as their name implies, by all devices. The system and method of the present invention formats these common channels in a fashion that provides useful information to the system and the WTRU for eventual establishment of the dedicated channels.

Figure 4:
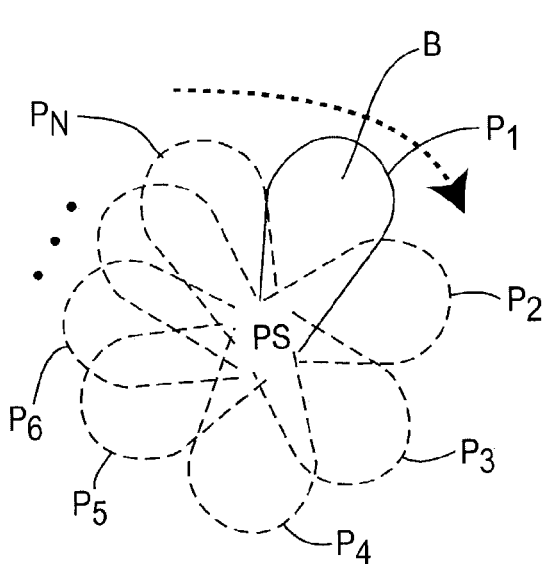
FIG. 4 is a rotating common channel beam emanating from a primary station.

Referring to FIG. 4, the dashed outlines represent possible positions $P_1-P_n$ for a common channel beam B emanating from a primary station (PS). At a particular time period, the beam B exists only in one of the positions $P_1$ as illustrated by the solid outline. The arrow shows the time sequencing of the beam B. In this illustration, the beam B sequentially moves from one clockwise position $P_1$ to another $P_2-P_n$, although a clockwise rotation is not necessary.

Figure 4A:
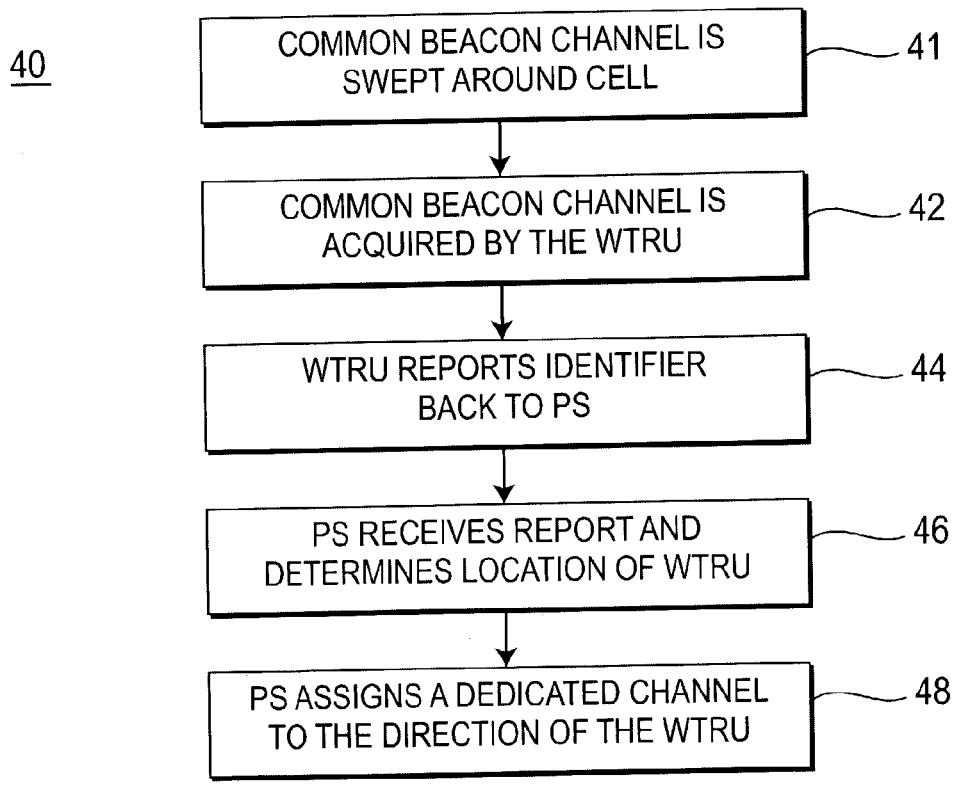
FIG. 4A is a flow diagram illustrating sweeping of the common beacon channel.

The system provides for identifying the beam B at each of the positions $P_1-P_n$. FIG. 4A is a flow diagram of a method 40 in accordance with the embodiment of the invention shown in FIG. 4. The transmitted identifying beam B, which includes a unique identifier while the beam B is in each position $P_1-Pn$, is swept around the cell (step 41). For example, at a first position $P_1$ a first identifier $I_1$ will be transmitted, at a second position $P_2$ a second identifier $I_2$ will be generated, and so on for each of the positions $P_1-P_n$. If the beam B is swept continuously, a different identifier $I_1-I_m$ may be generated for each degree, (or preset number of degrees), of rotation.

When a WTRU successfully acquires the beacon common channel (step 42), it reports the identifier number of the common channel it acquires to the PS (step 44). This information is used by the system to determine the WTRUs location (step 46). The PS then assigns a dedicated channel in the proper direction of the WTRU (step 48). Since the common channels are only in one sector for a short period of time, the overall interference caused by the common channels to the dedicated channels is substantially reduced. A minor disadvantage may be an extended acquisition time, but the disadvantage could be alleviated by increasing the data rate of the common channels.

A second embodiment for identifying the position $P_1-P_n$ of the beam B is to use a time mark as a type of identifier, which the WTRU returns to the PS. Returning either the time mark or the identifier to the PS informs the PS which beam B was detected by the WTRU. For that time period, the PS now knows the position $P_1-P_n$ of the beam B that was able to communicate with the WTRU. However, it should be noted that due to possible reflections, this is not necessarily the direction of the WTRU from the PS.

A third embodiment for identifying the position $P_1-P_n$ of the beam B is to use time-synchronization. The beam B is positioned and correlated with a known time mark. One way of achieving this is for both the WTRUs and the PS to have access to the same time reference, such as the global positioning system (GPS), National Institute of Standards and Technology internet time or radio time broadcasts (WWV) or local clocks with adequate synchronization maintained.

A fourth embodiment for identifying the position $P_1-P_n$ of the beam B is for the WTRUs and the PS to synchronize to timing marks coming from the infrastructure transmissions. The WTRUs can detect beam transmissions identifying the PS, but not necessarily the individual beam B positions $P_1-P_n$. By the WTRU reporting back to the PS the time factor when it detected the beam B, the PS can determine which beam B the WTRU is referencing. The benefit of this embodiment is that the common channel transmission does not have to be burdened with extra data to identify the position $P_1-P_n$ of the beam B.

A fifth embodiment for identifying the position of the beam B is to incorporate a GPS receiver within the WTRU. The WTRU then determines its geographical location by latitude and longitude and reports this information to the PS. The PS can then use this information to precisely generate the direction of the beam B, beam width and power. Another advantage of this embodiment is the precise location obtained of the WTRU, which will allow users to locate the WTRU if the need arises.

Figure 5:
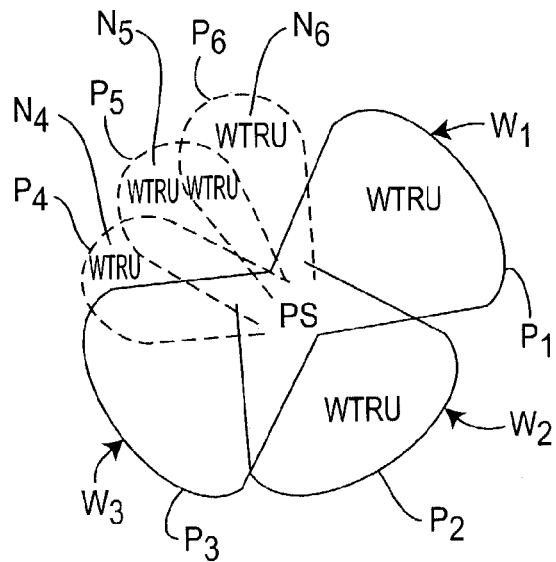
FIG. 5 is a beam configuration for known uneven distribution of WTRUs.

Referring to FIG. 5, the beam pattern may be tailored as desired by the system administrator. In this manner, the PS may position the beam B in a pattern consistent with the expected density of WTRUs in a particular area. For example, a wide beam $W_1$, $W_2$, $W_3$ may be cast in positions $P_1$, $P_2$, $P_3$, respectively with few WTRUs, and more narrow beams $N_4$, $N_5$, $N_6$ cast in positions $P_4$, $P_5$, $P_6$, respectively with many WTRUs. This facilitates the creation of narrower dedicated beams B in the denser areas and also increases the capacity for the uplink and downlink use of the common channels to establish initial communications.

The beam width manipulation is preferably performed in real time. However, the conditions of communication and the nature of the application determine the suitability of the number of beam positions $P_1-P_n$ and their associated beam width patterns. The beam patterns formed should be sufficiently wide such that the number of WTRUs entering and leaving the beam can be handled without excessive handoff to other beams. A static device can be serviced by a narrow beam. Swiftly moving cars for example, could not be serviced effectively by a narrow beam perpendicular to the flow of traffic, but could be serviced by a narrow beam parallel to the direction of travel. A narrow perpendicular beam would only be adequate for short message services, not for voice services such as phone calls.

Figure 6:
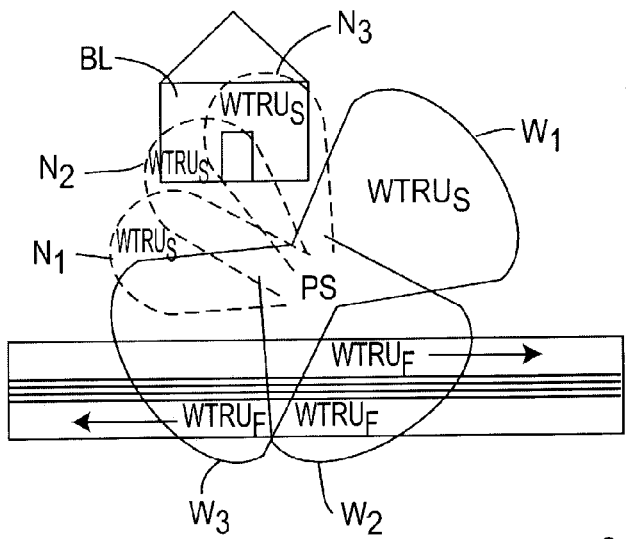
FIG. 6 is a beam configuration having the beam width adjusted for traffic type.

Another advantage to using different beam widths is the nature of the movement of WTRUs within a region. Referring to FIG. 6, a building BL is shown (representing an area having primarily slower moving pedestrian-speed devices $WTRU_s$), and a highway H is shown (representing an area having primarily faster-moving devices $WTRU_f$). The slower speed devices $WTRU_s$ can be served by narrow beams $N_1-N_3$ that are likely to be traversed during a communication time period. Alternatively, the faster moving devices WTRU$_f$ require wider beams W$_1$–W$_3$ to support a communication.

Beam width shaping also decreases the frequency of handover of WTRUs from one beam B to another. Handover requires the use of more system resources than a typical communication since two independent communication links are maintained while the handover is occurring. Handover of beams also should be avoided because voice communications are less able to tolerate the latency period often associated with handover.

Data services are packet size and volume dependent. Although a few small packets may be transmitted without problems, a large packet requiring a significant number of handovers may utilize excessive bandwidth. This would occur when links are attempted to be reestablished after a handover. Bandwidth would also be used up when multiple transmissions of the same data is sent in an attempt to perform a reliable transfer.

Downlink common channel communication will often be followed by uplink transmissions. By knowing the transmission pattern of the PS, the WTRU can determine the appropriate time to send its uplink transmission. To perform the necessary timing, a known fixed or broadcast time relationship is utilized. In the case of a fixed relationship, the WTRU uses a common timing clock. The WTRU waits until a time in which the PS has formed a beam over the WTRU's sector before transmitting. In the case of a broadcast time relationship, the PS informs the WTRU when to send its uplink signal. The uplink and downlink beam forming may or may not overlap. It is often an advantage to avoid overlap, so that a device responding to a transmission can respond in less time than would be required to wait an entire antenna beam forming timing cycle for the same time slot to occur.

It should be noted that CDMA and other RF protocols utilize some form of time division. When responding to these types of temporal infrastructures, both beam sectoring and the time slots of the protocol would be of concern. Other non-time dependent RF protocols, such as slotted Aloha would only involve sectoring.

The embodiment described hereinbefore was directed to "sweeping" the beam B around a PS in a sequential manner. In many instances this will typically be the most convenient way to implement the invention. There are, however, alternative ways to assume the various positions. For instance, it may be desirable to have more instances of coverage in certain areas. This could be done generating the beam in a sequence of timed positions. For instance, if there are 7 positions, (numbered 1 through 7), a sequence of (1, 2, 3, 4, 2, 5, 6, 2, 7, 1) could be used. This would have the area covered by beam position number 2 more often than other positions, but with the same dwell time. It might also be desirable to have a longer dwell time in a region. The sequence (1, 2, 3, 4, 4, 5, 6, 7, 1) for instance would have beam position number 4 remain constant for two time periods. Any suitable sequencing could be utilized and modified as analysis of the situation warranted.

Likewise, it is not necessary to restrict the beam positions to a rotating pattern. The beam positions could be generated in any sequence that serves the operation of the communication system. For example, a pattern that distributed the beams B over time such that each quadrant was covered by at least one beam B might be useful for WTRUs that are closer to the PS and are likely to be covered by more than one beam position.

It should be noted that similar to all RF transmissions, an RF signal only stops at a physical point if there is a Faraday-type of obstruction, (e.g. grounded metal roof). Usually the signal dies off, and the boundary is some defined attenuation value from the peak value of the transmission. To provide adequate coverage in the application of this invention, it is preferable that adjacent beam positions overlap to some degree. The overlap will tend to be more pronounced closer to the transmission and reception antennas. Close to an infrastructure antenna site, any WTRU is therefore likely able to communicate via a number of differently positioned beams B. Devices able to communicate via several beam positions could therefore, if needed, achieve higher data rates using these multiple positions. Devices further away, however, are more likely to be able to communicate via only once instant of beaming, and to obtain higher data rates would require another technique such as a longer dwell time.

Figure 7:
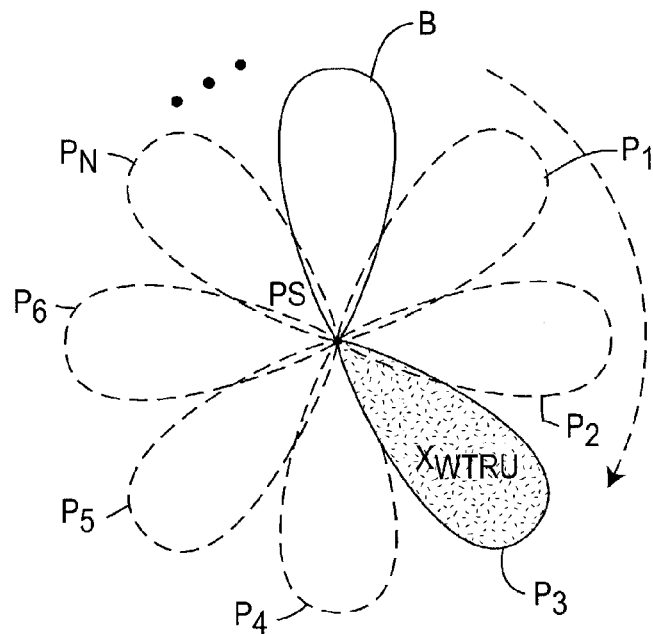
FIG. 7 is a beam configuration having equivalent coverage areas for both dedicated and common channels.

Referring to FIG. 7, which is an embodiment where the common beacon channel is swept through a cell which is divided into n number of P positions, designated P$_1$ through P$_n$. Each position P represents a different common channel beam B. A WTRU is located in beam position P$_3$ and a PS is located at the center of the cell.

Figure 9:
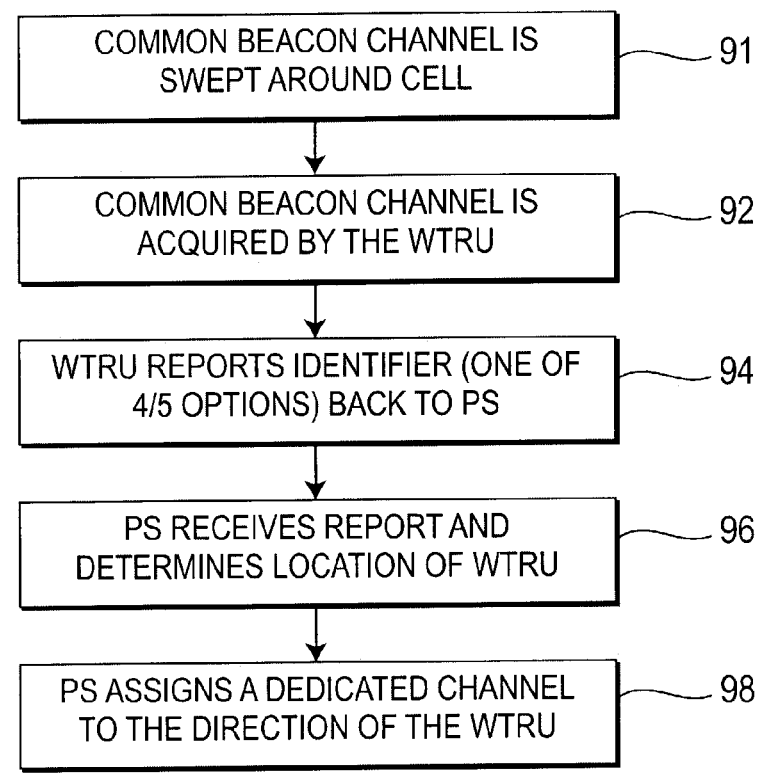
FIG. 9 is a flow diagram of an embodiment in which the common beacon channel is swept.

Referring to FIG. 9, a procedure in accordance with the embodiment of the present invention of FIG. 7 is shown. The procedure 90 commences as the common beacon channel is swept around the cell (step 91) through positions P$_1$ to P$_n$. Each position P represents the physical location of the antenna's focused energy and its an identifier of the unique common beacon channel signal. A WTRU located in the cell's coverage area acquires a unique common beacon channel (step 92). The WTRU then reports back to the PS the acquired beam's identifier (step 94). The PS receives the identifier from the WTRU and determines the WTRUs location (step 96). The PS then assigns a dedicated channel to the direction of the WTRU (step 98).

Figure 8:
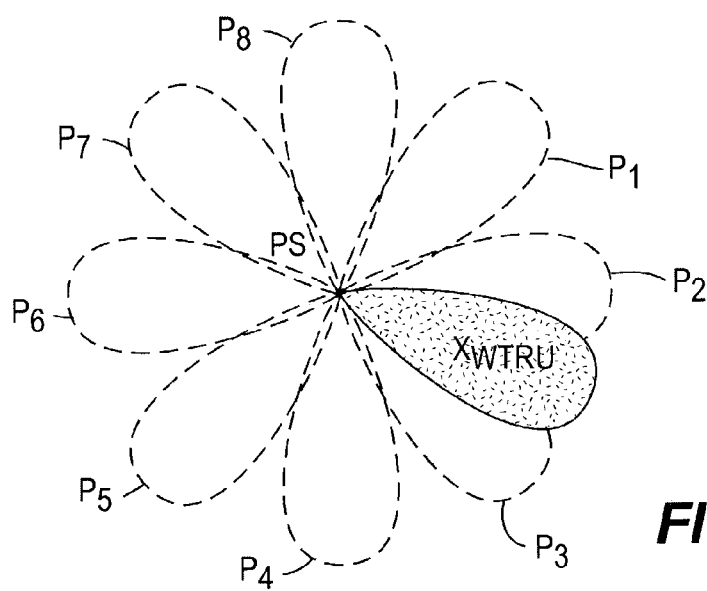
FIG. 8 is a beam configuration having equivalent coverage areas for both dedicated and common channels.

Another embodiment of the present invention, shown in FIG. 8, comprises having a common channel beam present in every sector, without having to sweep about the cell's coverage area. Although such an alternative slightly increases the interference in the cell, it provides the same amount of coverage area for both the common and dedicated channels. As shown, the PS has eight positions P$_1$–P$_8$, each representing a different unique common beacon channel signal which are not swept. A WTRU is located in position P4.

Figure 10:
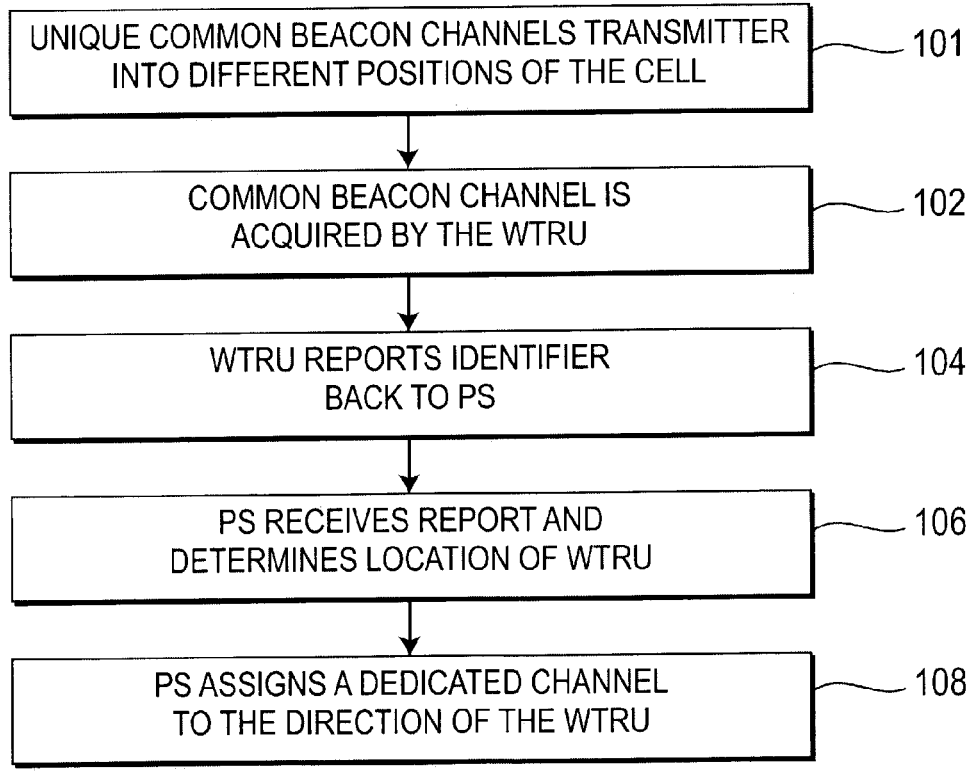
FIG. 10 is a flow diagram of an embodiment in which the unique common beacon channels are transmitted to different positions of a cell.

Referring to FIG. 10, an alternative procedure 100 in accordance with the embodiment of the invention of FIG. 8 is shown. Eight unique common beacon channel signals are transmitted into the cell (step 101) in positions P$_1$ to P$_8$. Each position P represents the physical location of the antenna's focused energy and an identifier of the unique common beacon channel signal. A WTRU located in the cell's coverage area acquires one of the eight unique common beacon channels (step 102) and the WTRU reports back to the PS which beam it acquired by the beam's identifier (step 104). The PS receives the identifier from the WTRU and determines the location of the WTRU (step 106). The PS then assigns a dedicated channel to the direction of the WTRU (step 108).

In the case of a WTRU being located on or near the border of two or more sectors, the WTRU may have difficulty identifying to which sector to associate. When the WTRU acquires a sector, the system deploys hysteresis in its acquisition algorithm to ensure that the WTRU has an acceptable signal quality for some definite time before the WTRU hops to another sector.

It should be understood by those of skill in the art, that the number of beams, or beam positions located throughout a cell as described herein has been used by way of example. A greater or lesser number of beams, or beam positions, may be implemented without departing from the spirit and scope of the present invention.

What is claimed is:

1. A communication system for transmitting and receiving communications between at least one primary station and at least one secondary station, the system transmits a plurality of common channels covering a sectorized cell using at least one beam comprising:
   means for generating and shaping a beam;
   an antenna for transmitting and receiving signals within said beam;
   means for sweeping said shaped beam, wherein said sweeping means selectively directs the shaped beam at a plurality of directions in a predetermined non-consecutive sequence to selectively direct the beam toward at least one of the plurality of directions more frequently than the other plurality of directions while incorporating a beam identification for each direction;
   means for said secondary station to acknowledge said beam by transmitting the beam identification to said primary station; and
   means for said primary station to determine the location of the secondary station from the received beam identification; and said primary station utilizing a dedicated channel beam based on said secondary station's location to communicate with said secondary station.

2. The system of claim 1 wherein said non-consecutive sequence causes the sweeping means to selectively direct the beam at some of the plurality of directions for a longer duration than others of the plurality of directions.

3. A system for facilitating the transmission and reception of communications between at least one primary station and at least one secondary station, the system transmits a plurality of common channels covering a sectorized cell using at least one beam comprising:
   an antenna, for generating a beam for transmitting a communication and for receiving a communication;
   means for shaping the beam;
   means for sweeping said shared beam, wherein said sweeping means selectively directs the shaped beam at a plurality of directions in a predetermined non-consecutive sequence to selectively direct the beam toward at least one of the plurality of directions more frequently than the other plurality of directions while incorporating a beam identification for each direction;
   means for said secondary station to acknowledge said beam by transmitting the beam identification to said primary station; and
   means for said primary station to determine the location of the secondary station from the received beam identification; and said primary station utilizing a dedicated channel beam based on said secondary station's location to communicate with said secondary station.

4. The system of claim 3 wherein said non-consecutive sequence causes the sweeping means to selectively direct the beam at some of the plurality of directions for a longer duration than others of the plurality of directions.

* * * * *

UNITED STATES PATENT AND TRADEMARK OFFICE
CERTIFICATE OF CORRECTION

PATENT NO.      : 7,043,274 B2
APPLICATION NO. : 10/329886
DATED           : May 9, 2006
INVENTOR(S)     : Angelo Cuffaro Page 1 of 1

It is certified that error appears in the above-identified patent and that said Letters Patent is hereby corrected as shown below:

At Sheet 4 of 4, FIG. 10, area 101, delete "UNIQUE COMMON BEACON CHANNELS TRANSMITTER INTO DIFFERENT POSITIONS OF THE CELL" and insert therefor --UNIQUE COMMON BEACON CHANNELS TRANSMITTED INTO DIFFERENT POSITIONS OF THE CELL--.

At column 1, line 12, after "No. 60/420,355,", delete "filled" and insert therefor --filed--.

At column 3, line 19, after the words "is not", insert --the--.

At column 3, line 53, after the words "determine the", delete "WTRUs", and insert therefor --WTRU's--.

At column 6, line 33, after the words "determines the", delete "WTRUs", and insert therefor --WTRU's--.

At claim 3, column 8, line 11, after the word "said", delete "shared" and insert therefor --shaped--.

Signed and Sealed this

Nineteenth Day of December, 2006

JON W. DUDAS
*Director of the United States Patent and Trademark Office*